(12) United States Patent
Du et al.

(10) Patent No.: US 10,003,253 B2
(45) Date of Patent: Jun. 19, 2018

(54) HYBRID TRANSFORMATION SYSTEM BASED ON THREE-PHASE PWM RECTIFIER AND MULTI-UNIT UNCONTROLLED RECTIFIER AND CONTROL METHOD THEREOF

(71) Applicant: SOUTH CHINA UNIVERSITY OF TECHNOLOGY, Guangdong (CN)

(72) Inventors: Guiping Du, Guangdong (CN); Zhifei Liu, Guangdong (CN); Tiansheng Zhu, Guangdong (CN)

(73) Assignee: SOUTH CHINA UNIVERSITY OF TECHNOLOGY, Guangdong (CN)

( * ) Notice: Subject to any disclaimer, the term of this patent is extended or adjusted under 35 U.S.C. 154(b) by 0 days. days.

(21) Appl. No.: 15/570,378

(22) PCT Filed: Jul. 21, 2015

(86) PCT No.: PCT/CN2015/084674
§ 371 (c)(1),
(2) Date: Oct. 30, 2017

(87) PCT Pub. No.: WO2016/173130
PCT Pub. Date: Nov. 3, 2016

(65) Prior Publication Data
US 2018/0145585 A1    May 24, 2018

(30) Foreign Application Priority Data
Apr. 30, 2015  (CN) .......................... 2015 1 0219268

(51) Int. Cl.
*H02J 1/10*   (2006.01)
*H02M 7/08*   (2006.01)
(Continued)

(52) U.S. Cl.
CPC ......... *H02M 1/4216* (2013.01); *H02M 7/219* (2013.01)

(58) Field of Classification Search
CPC ................ H02M 2001/0074; H02M 2001/008
(Continued)

(56) References Cited

U.S. PATENT DOCUMENTS

| | | | |
|---|---|---|---|
| 6,859,374 B2 * | 2/2005 | Pollanen | H02M 7/5387 363/69 |
| 7,872,885 B2 * | 1/2011 | Itkonen | H02M 1/088 363/65 |

(Continued)

FOREIGN PATENT DOCUMENTS

| | | |
|---|---|---|
| CN | 101102078 | 1/2008 |
| CN | 101741235 | 6/2010 |

(Continued)

OTHER PUBLICATIONS

Yang et al., "A Step-down Three-phase PFC With Controllable Output Voltage for Aircraft," Proceedings of Symposium on Power Electronics & Electrical Drives, Dec. 2010, pp. 24-30.
(Continued)

*Primary Examiner* — Gary Nash
(74) *Attorney, Agent, or Firm* — JCIPRNET

(57) ABSTRACT

The present invention discloses a hybrid transformation system based on three-phase voltage type PWM rectifier and multi-unit uncontrolled rectifier. The hybrid transformation system mainly consists of a three-phase reactor (L), a three-phase voltage type PWM rectifier module, an N-unit three-phase uncontrolled rectifier bridge module group, capacitors (C0-CN) and a DSP control circuit. An input end of the three-phase voltage type PWM rectifier module is in parallel connection with an input end of each three-phase uncontrolled rectifier bridge module. The three-phase volt- (Continued)

age type PWM rectifier module may work in to situations, with load or without load, and the three-phase voltage type PWM rectifier module just does reactive power compensation when working without load. All modules of the three-phase uncontrolled rectifier bridge module group may work in to situations, with loads independently or all the outputs are in parallel connection and with a same load. The hybrid rectifier system has advantages such as unity input power factor, grid side current low harmonic, high power output, low cost, easy control, and etc.

3 Claims, 8 Drawing Sheets

(51) Int. Cl.
*H02M 1/00* (2006.01)
*H02M 5/42* (2006.01)
*H02M 7/04* (2006.01)
*H02M 7/68* (2006.01)
*H02M 1/42* (2007.01)
*H02M 7/219* (2006.01)

(58) Field of Classification Search
USPC ....... 363/65, 67, 69, 70, 78, 84, 87, 89, 129
See application file for complete search history.

(56) References Cited

U.S. PATENT DOCUMENTS

| | | | | |
|---|---|---|---|---|
| 8,553,440 | B1* | 10/2013 | Nanut | H02M 1/12 363/129 |
| 2005/0162877 | A1* | 7/2005 | Wagoner | H02J 3/005 363/123 |
| 2006/0066283 | A1* | 3/2006 | Ota | H02M 5/4585 318/803 |
| 2007/0258275 | A1* | 11/2007 | Brochu | H02M 7/08 363/64 |
| 2009/0003020 | A1* | 1/2009 | Zhang | H02M 1/32 363/65 |
| 2009/0067206 | A1* | 3/2009 | Oguchi | H02M 7/08 363/124 |
| 2011/0216564 | A1* | 9/2011 | Swamy | H02M 7/08 363/126 |
| 2012/0212984 | A1* | 8/2012 | Yamada | H02M 7/219 363/89 |

FOREIGN PATENT DOCUMENTS

| | | |
|---|---|---|
| CN | 103296905 | 9/2013 |
| JP | 2000324843 | 11/2000 |

OTHER PUBLICATIONS

"International Search Report (Form PCT/ISA/210)", dated Jan. 26, 2016, with English translation thereof, pp. 1-4.

* cited by examiner

HYBRID TRANSFORMATION SYSTEM BASED ON THREE-PHASE PWM RECTIFIER AND MULTI-UNIT UNCONTROLLED RECTIFIER AND CONTROL METHOD THEREOF

CROSS-REFERENCE TO RELATED APPLICATION

This application is a 371 of international application of PCT application serial no. PCT/CN2015/084674, filed on Jul. 21, 2015, which claims the priority benefit of China application no. 201510219268.9, filed on Apr. 30, 2015. The entirety of each of the abovementioned patent applications is hereby incorporated by reference herein and made a part of this specification.

FIELD OF THE INVENTION

The present invention relates to three-phase rectifier technology, and particularly relates to a hybrid AC/DC (Alternating Current/Direct Current) transformation system based on three-phase voltage type PWM rectifier and multi-unit uncontrolled rectifier, belonging to a technical field of power electronic communication.

DESCRIPTION OF RELATED ART

With the development of industrial and economic technologies, requirements of high power supply are also getting higher and higher. The traditional high power supply has a high harmonic and a low power factor, which not only has a great impact on the power grid but will also cause great losses. In order to achieve a unity power factor, an active power filter, PFC (Power Factor Correction), and a three-phase voltage type PWM (Pulse Width Modulation) rectifier are usually used. In particular, the three-phase voltage type PWM rectifier may eliminate an input current harmonic fundamentally and has a unit power factor, thereby attracting extensive attention from the power electronic field currently. However, it cannot be universal used because of technical difficulties such as high cost, circulation existing in multi-machine paralleling.

BRIEF SUMMARY OF THE INVENTION

Aiming at problems currently existing in improving high power supply ha ionic and power factor, an object of the present invention is to provide a high-power hybrid AC/DC transformation system that is stable and reliable, low cost, with low current harmonic and unity power factor.

In order to achieve the above-described object, the technical solution adopted in the present invention is as follows:

a hybrid AC/DC transformation system based on three-phase voltage type PWM rectifier and multi-unit uncontrolled rectifier, comprises: a three-phase reactor, a three-phase voltage type PWM rectifier module, an N-unit three-phase uncontrollable rectifier bridge module group, capacitors, and a DSP (Digital Signal Processing) control circuit. The three-phase reactor at an end is connected to a three-phase power grid, other ends are connected to a middle of a bridge arm of a three-phase voltage type PWM rectifier module and a middle of a bridge arm of each three-phase uncontrollable rectifier bridge module, that is, the three-phase voltage type PWM rectifier module is connected in parallel to an input end of the N-unit three-phase uncontrollable rectifier bridge module group. The three-phase voltage type PWM rectifier module uses a six-switch three-phase half-bridge circuit topology. Each module of the three-phase uncontrolled rectifier module group consists of a three-phase diode rectifier bridge module group.

An output of the transformation system has a plurality of alternative work modes: (1) in the N-unit three-phase uncontrollable rectifier bridge module group, an output end of each three-phase uncontrolled rectifier bridge module is connected to a same load RL and a same capacitor CL to realize parallel connection, while the three-phase voltage type PWM rectifier module works without load, and an output of the three-phase voltage type PWM rectifier module is connected only to a capacitor C0; (2) in the N-unit three-phase uncontrollable rectifier bridge module group, an output end of each three-phase uncontrolled rectifier bridge module is connected to a same load RL and a same capacitor CL to realize parallel connection, while the three-phase voltage type PWM rectifier module works with load, and at this moment, an output of the three-phase voltage type PWM rectifier module is in parallel connection with a capacitor C0 and a load R*; (3) in the N-unit three-phase uncontrollable rectifier bridge module group, an output end of each three-phase uncontrolled rectifier bridge module is independently with loads (R1 ... RN), respectively, each load is in parallel connection with capacitors (C1 ... CN), respectively, while the three-phase voltage type PWM rectifier module works without load, and an output of the three-phase voltage type PWM rectifier module is connected only to a capacitor C0; or (4) in the N-unit three-phase uncontrollable rectifier bridge module group, an output end of each three-phase uncontrolled rectifier bridge module is independently with the loads (R1 ... RN), respectively, each load is in parallel connection with capacitors (C1 ... CN), respectively, while the three-phase voltage type PWM rectifier module works with load, and at this moment, an output of the three-phase voltage type PWM rectifier module is in parallel connection with a capacitor C0 and a load R*.

An inductance value of the three-phase reactor may be selected according to requirements of a harmonic and a power of the system, and preferably its range is 0.1 mH to 1.5 mH. A capacitance of the capacitor is selected according to requirements of an output voltage ripple of the system, and preferably its range is 2000 uf to 6000 uf.

A control method for the above-described hybrid AC/DC transformation system based on three-phase voltage type PWM rectifier and multi-unit uncontrolled rectifier is: (a) using a phase-locking circuit to obtain a zero crossing point of a-phase power grid ea, the DSP real-time computing a cycle of the power grid according to the zero crossing point of the a-phase power grid ea and thereby changing a control cycle, meanwhile calculating three-phase input power grid voltage values (ea, eb, ec) according to the zero crossing point of the a-phase power grid ea; (b) sampling input current values (ia, ib, ic) of the three-phase reactor using a hall current transducer, respectively, sampling a DC voltage value U* at both sides of the capacitor C0 at DC side of the three-phase voltage type PWM rectifier module using a partial voltage method, and switching to a voltage of 0 to 3V by conditioning an operational circuit; and (c) the DSP control circuit conducting a control computation according to sampled values (obtained in (a) and (b)), a specific control method may uses commonly used feed-forward decoupling control, current predictive control, fuzzy control to realize control of unity power factor. Under the various work modes and different levels of power output, the same control method may be used without independent adjustment, which is simple and easy.

Compared with the prior art, the beneficial effects of the present invention are as follows:

1. Low Cost and High Efficiency.

The present system only needs to control one three-phase voltage type PWM rectifier module, and the three-phase uncontrolled rectifier module in parallel connection can be added or subtracted according to requirements of work, resulting in low cost and high efficiency.

2. Realization of Controllability of an Output Voltage at DC Side of the Three-Phase Uncontrolled Rectifier Module.

The present system controls an input side voltage of the three-phase voltage type PWM rectifier module by controlling a reactor input current at AC side, thereby realizing controllability of the output voltage at DC side of the three-phase voltage type PWM rectifier module. Since in the present system, the three-phase voltage type PWM rectifier module is connected in parallel to an input end of the N-unit three-phase uncontrolled rectifier module group, the controllability of the output voltage at DC side of the N-unit three-phase uncontrolled rectifier module group may be realized.

3. Input Unity Power Factor.

The present system directly controls the reactor input current at AC side by the three-phase voltage type PWM rectifier module, and indirectly controls an AC input side current of the three-phase voltage type PWM rectifier module, thereby adjusting reactive power compensation of the three-phase voltage type PWM rectifier module to the system, realizing operation of AC input side unity power factor.

4. The System is Reliable and Stable, and No Circulation Exists.

The present system contains the three-phase uncontrolled rectifier module. Since a single phase conductivity of the diode, the system cannot generate circulation. Since the system only needs to control one three-phase voltage type PWM rectifier module, it is more reliable and stable compared to the existing system that needs to control two or more three-phase voltage type PWM rectifier modules.

DETAILED DESCRIPTION OF THE INVENTION

Figure 1A:
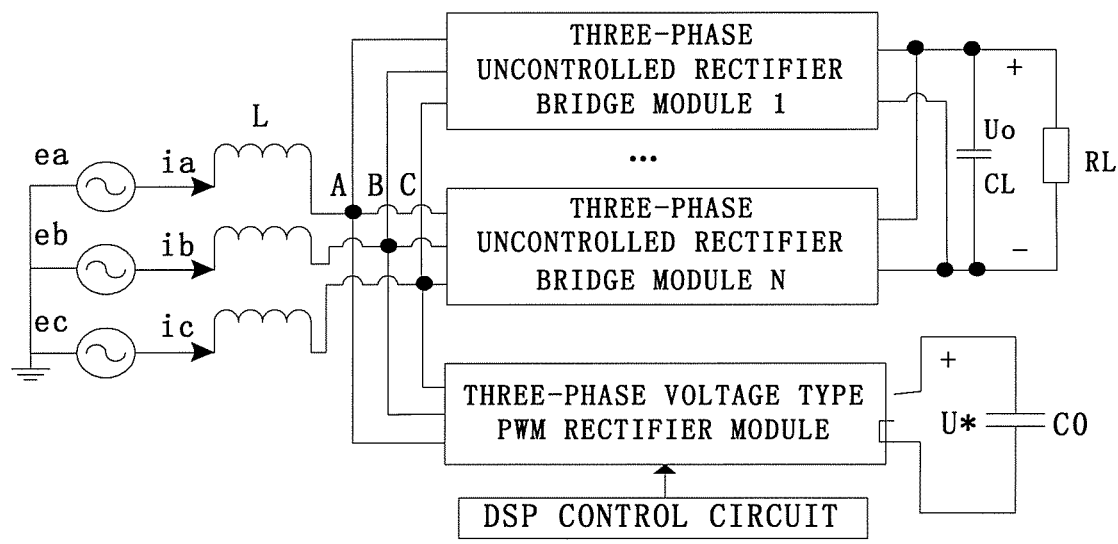
FIG. 1a is a structural block diagram of a hybrid AC/DC transformation system based on three-phase voltage type PWM rectifier and multi-unit uncontrolled rectifier according to the present invention.
Figure 1B:
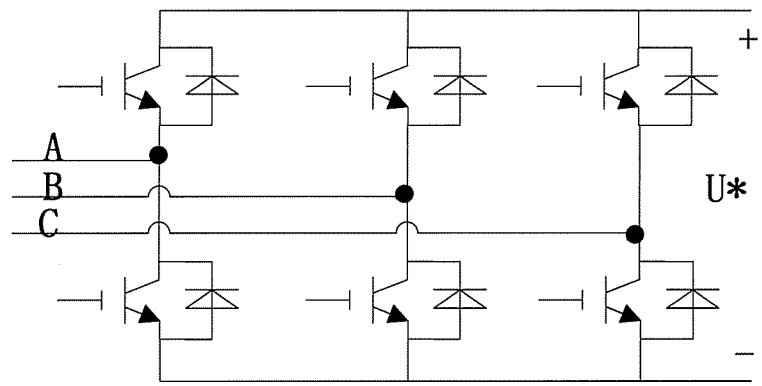
FIG. 1b is a structure chart of a three-phase voltage type PWM rectifier module.
Figure 1C:
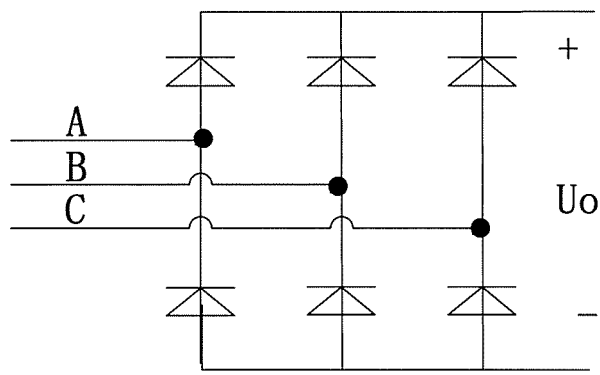
FIG. 1c is a unit structure diagram of a three-phase uncontrolled rectifier module.
Figure 1D:
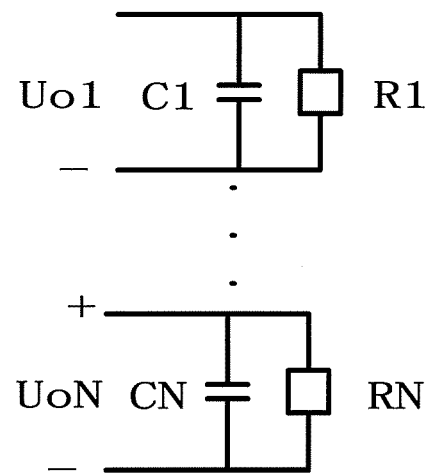
FIG. 1d is a structure chart of an N-unit three-phase uncontrolled rectifier bridge module group with load respectively.
Figure 1E:
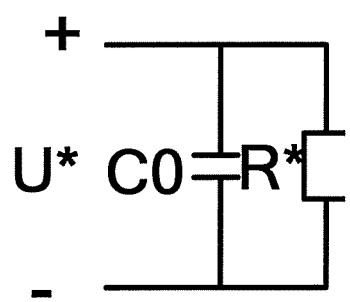
FIG. 1e is a structure chart of a three-phase voltage type PWM rectifier module with load.

The present invention is further described in detail below in combination with accompanying drawings and specific embodiments, but implementations and protection of the present invention are not limited hereto. If there is anything that is not specified, it can be realized by a person skilled in the art according to the prior art.

A hybrid AC/DC transformation system based on three-phase voltage type PWM rectifier and multi-unit uncontrolled rectifier, as shown in FIG. 1, comprises: a three-phase reactor L, a three-phase voltage type PWM rectifier module rectifying circuit, an N-unit three-phase uncontrollable rectifier bridge module group, capacitors (C0, CL, C1 . . . CN), and a DSP control circuit, wherein N≥1. The three-phase reactor at an end is connected to a three-phase power grid, other ends (A, B, C) are connected to a middle of a bridge arm of the three-phase voltage type PWM rectifier module and a middle of a bridge arm of each three-phase uncontrollable rectifier bridge module group, respectively, that is, the three-phase voltage type PWM rectifier module is connected in parallel to an input end of the N-unit three-phase uncontrollable rectifier bridge module group. The three-phase voltage type PWM rectifier module uses a six-switch three-phase half-bridge circuit topology. Each module of the three-phase uncontrolled rectifier module group consists of a three-phase diode rectifier bridge module group.

An output of the transformation system has a plurality of alternative work modes: (1) in the N-unit three-phase uncontrollable rectifier bridge module group, an output end of each three-phase uncontrolled rectifier bridge module is connected to a same load RL and a same capacitor CL to realize parallel connection, while the three-phase voltage type PWM rectifier module works without load, and the three-phase voltage type PWM rectifier module output is connected only to a capacitor C0; (2) in the N-unit three-phase uncontrollable rectifier bridge module group, an output end of each three-phase uncontrolled rectifier bridge module is connected to a same load RL and a same capacitor CL to realize parallel connection, while the three-phase voltage type PWM rectifier module works with load, and at this moment, an output of the three-phase voltage type PWM rectifier module is in parallel connection with a capacitor C0, and a load R*; (3) in the N-unit three-phase uncontrollable rectifier bridge module group, an output end of each three-phase uncontrolled rectifier bridge module is independently with loads (R1 . . . RN), respectively, each load is in parallel connection with capacitors (C1 . . . CN), respectively, while the three-phase voltage type PWM rectifier module works without load, and an output of the three-phase voltage type PWM rectifier module is connected only to a capacitor C0; or (4) in the N-unit three-phase uncontrollable rectifier bridge module group, an output end of each three-phase uncontrolled rectifier bridge module is independently with the loads (R1 . . . RN), respectively, each load is in parallel connection with capacitors (C1 . . . CN), respectively, while the three-phase voltage type PWM rectifier module works with load, and at this moment, an output of three-phase voltage type PWM rectifier module is in parallel connection with a capacitor C0, and a load R*. When the three-phase voltage type PWM rectifier module works without load, it just does reactive power compensation at this moment; when it works with load, it not only does reactive power compensation, but also does power output.

An inductance value of the three-phase reactor L may be selected according to requirements of a harmonic and a power of the system, and preferably its range is 0.1 mH to 1.5 mH. A capacitance of the capacitor (C0, CL, C1 . . . CN) is selected according to requirements of an output voltage ripple of the system, and preferably its range is 2000 uf to 6000 uf.

A control method for the hybrid AC/DC transformation system based on three-phase voltage type PWM rectifier and multi-unit uncontrolled rectifier according to any of the above is: (a) using a phase-locking circuit to obtain a zero crossing point of an a-phase power grid ea, the DSP real-time computing a cycle of the power grid according to the zero crossing point of the a-phase power grid ea, and thereby changing a control cycle, meanwhile calculating three-phase input power grid voltage values (ea, eb, ec) according to the zero crossing point of the a-phase power grid ea; (b) sampling input current values (ia, ib, ic) of the three-phase reactor using a hall current transducer, respectively, sampling a DC voltage value U* at both sides of the capacitor C0 at DC side of the three-phase voltage type PWM rectifier module using a partial voltage method, and switching to a voltage of 0 to 3V by conditioning an operational circuit; and (c) the DSP control circuit conducting a control computation according to sampled values (obtained in (a) and (b)), a specific control method may uses commonly used feed-forward decoupling control, current predictive control, fuzzy control to realize control of unity power factor. Under the various work modes and different levels of power output, the three-phase voltage type PWM rectifier module may use the same control method without independent adjustment, which is simple and easy.

Preferably, the DSP may select and use Texas Instruments 2000 series.

Figure 2A:
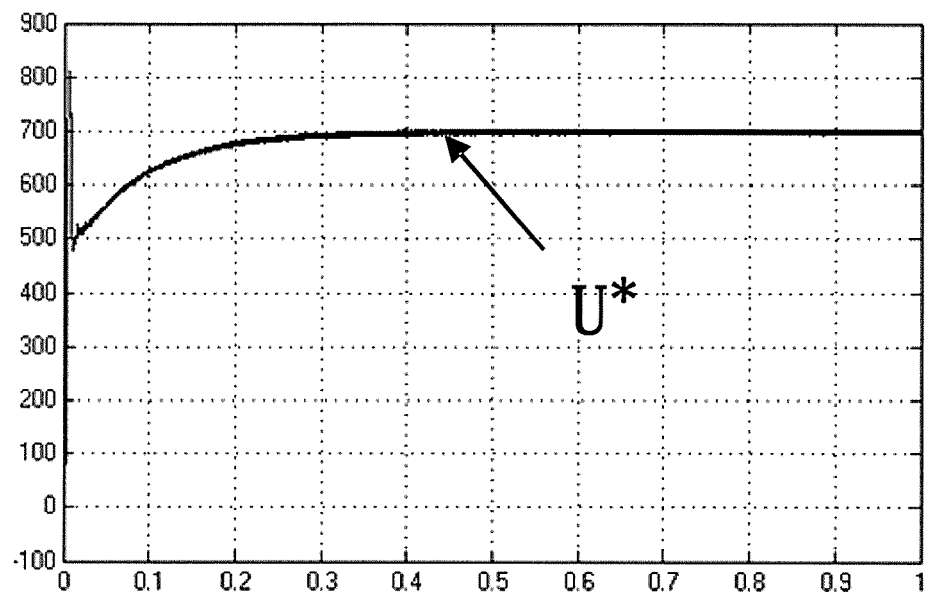
FIG. 2a to FIG. 2c are effect pictures of an output voltage U* (output voltage at DC side of the three-phase voltage type PWM rectifier module), an output voltage $U_o$ (output voltage at DC side when the N-unit three-phase uncontrolled rectifier bridge module group is in parallel connection) and an input voltage ea (power grid a-phase voltage), an input current ia (AC input a-phase current) of MATLAB simulation, working in mode (1), respectively.
Figure 2B:
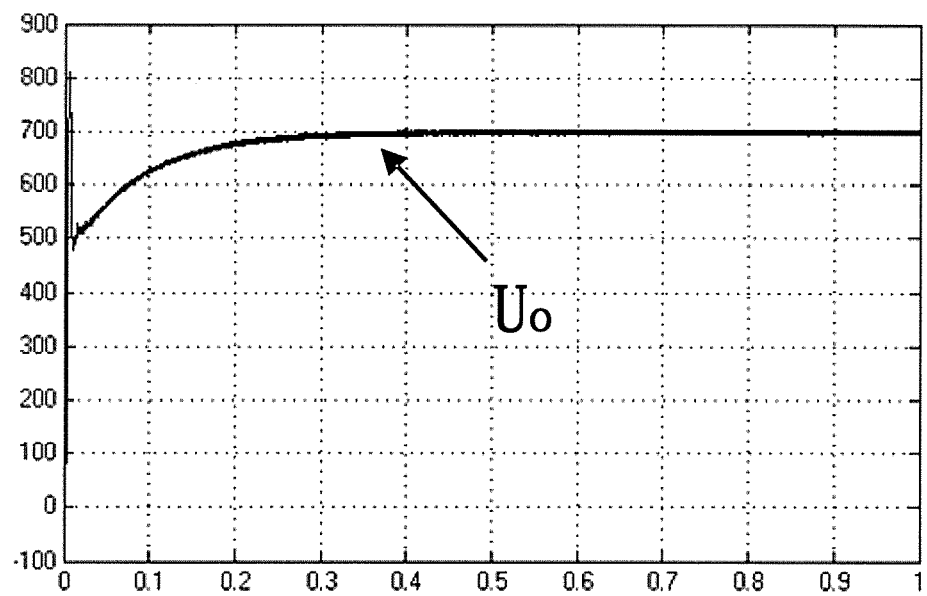
Figure 2C:
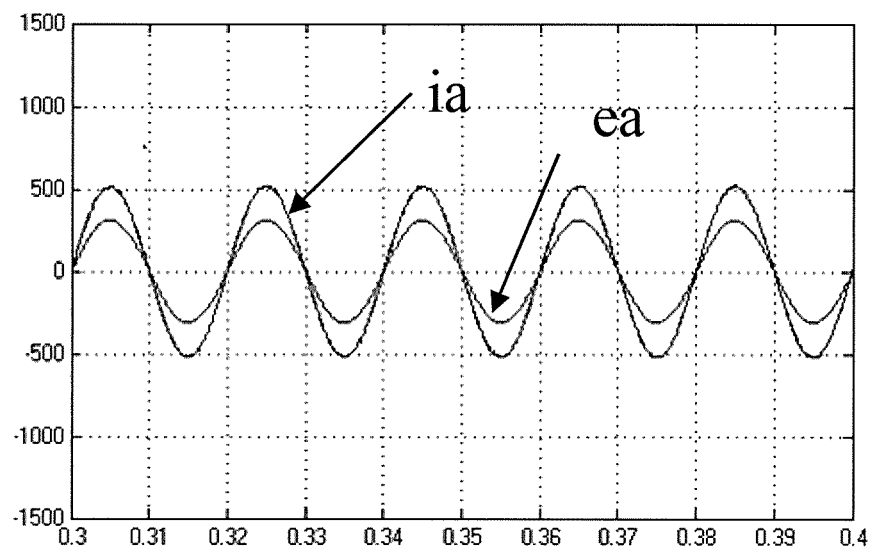

FIG. 2a to FIG. 2c are effect pictures of an output voltage U* (output voltage at DC side of the three-phase voltage type PWM rectifier module), an output voltage $U_o$ (output voltage at DC side when the N-unit three-phase uncontrolled rectifier bridge module group is in parallel connection) and an input voltage ea (power grid a-phase voltage), an input current ia (AC input a-phase current) of MATLAB simulation, working in mode (1), respectively.

Figure 3A:
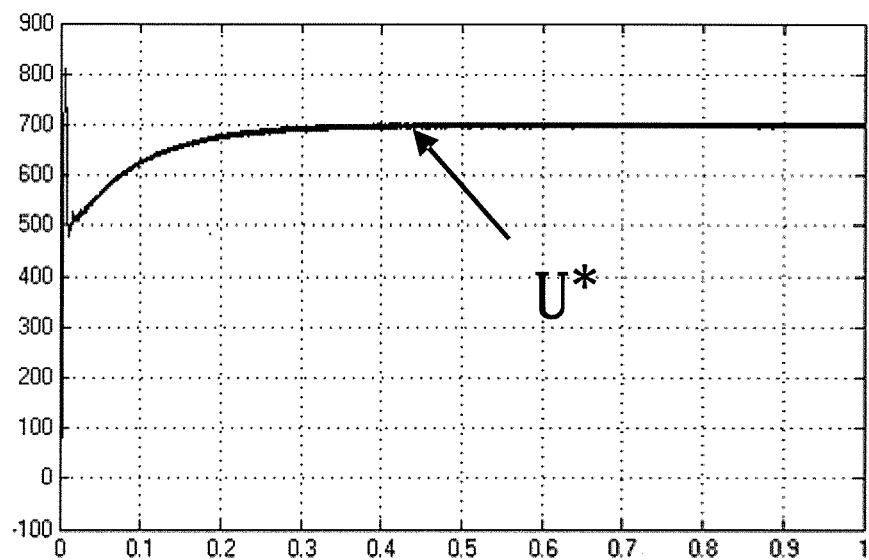
FIG. 3a to FIG. 3c are effect pictures of an output voltage U* (output voltage at DC side of the three-phase voltage type PWM rectifier module), an output voltage $U_o$ (output voltage at DC side when the N-unit three-phase uncontrolled rectifier bridge module group is in parallel connection) and an input voltage ea (power grid a-phase voltage), input current ia (a-phase input current at AC side) of MATLAB simulation, working in mode (2), respectively.
Figure 3B:
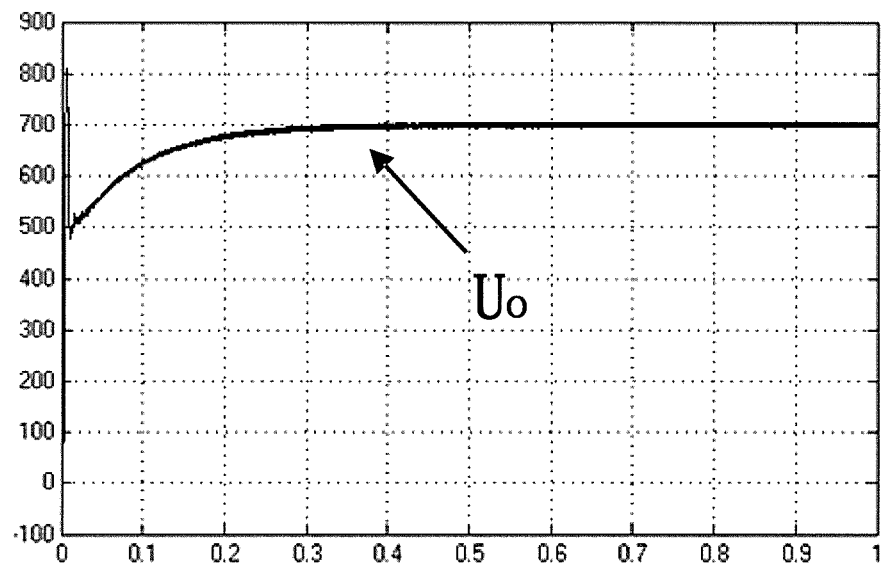
Figure 3C:
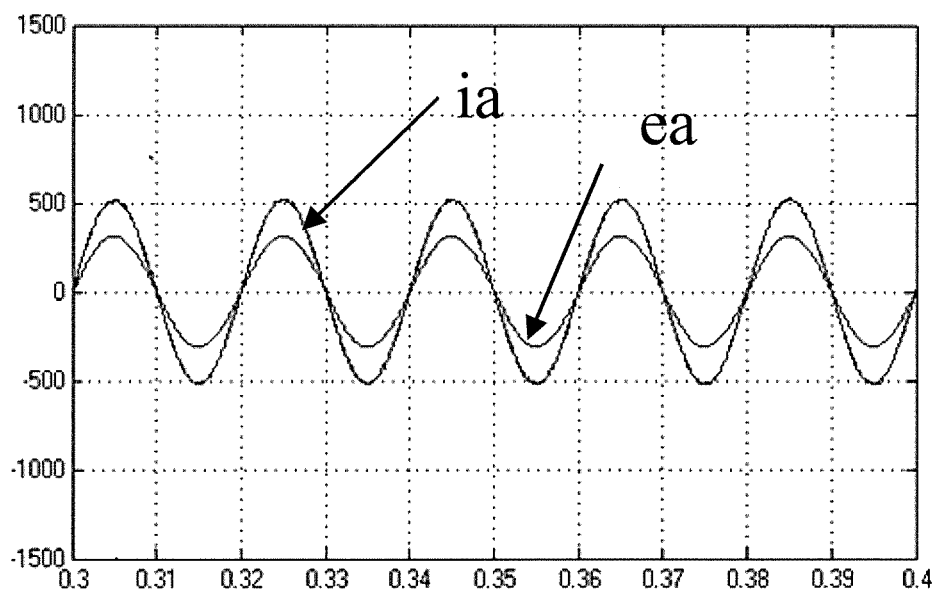

FIG. 3a to FIG. 3c are effect pictures of an output voltage U* (output voltage at DC side of the three-phase voltage type PWM rectifier module), an output voltage $U_o$ (output voltage at DC side when the N-unit three-phase uncontrolled rectifier bridge module group is in parallel connection) and an input voltage ea (power grid a-phase voltage), input current ia (a-phase input current at AC side) of MATLAB simulation, working in mode (2), respectively.

Figure 4A:
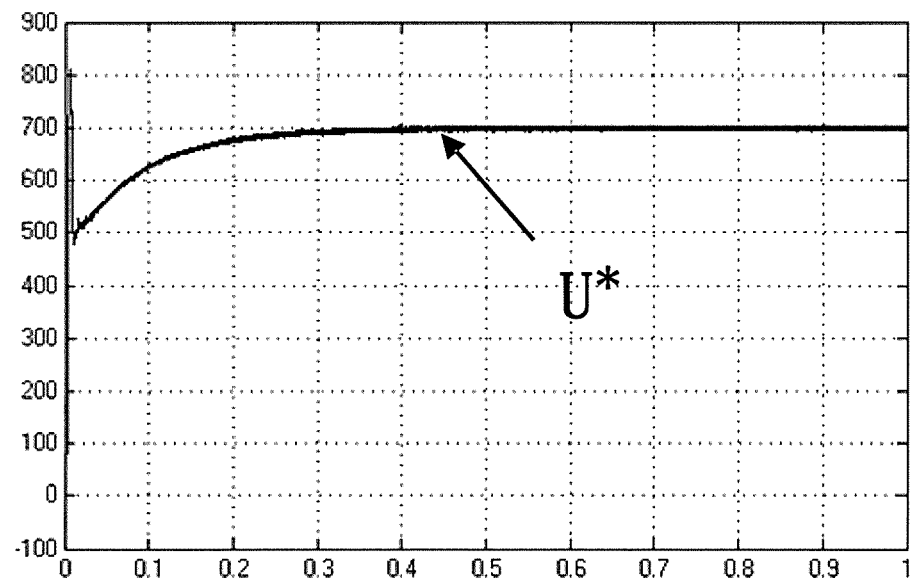
FIG. 4a to FIG. 4c are effect pictures of an output voltage U* (output voltage at DC side of the three-phase voltage type PWM rectifier module), an output voltage $U_{oN}$ (respective output voltage at DC side of the N-unit three-phase uncontrolled rectifier bridge module) and an input voltage ea (power grid a-phase voltage), input current ia (a-phase input current at AC side) of MATLAB simulation, working in mode (3), respectively.
Figure 4B:
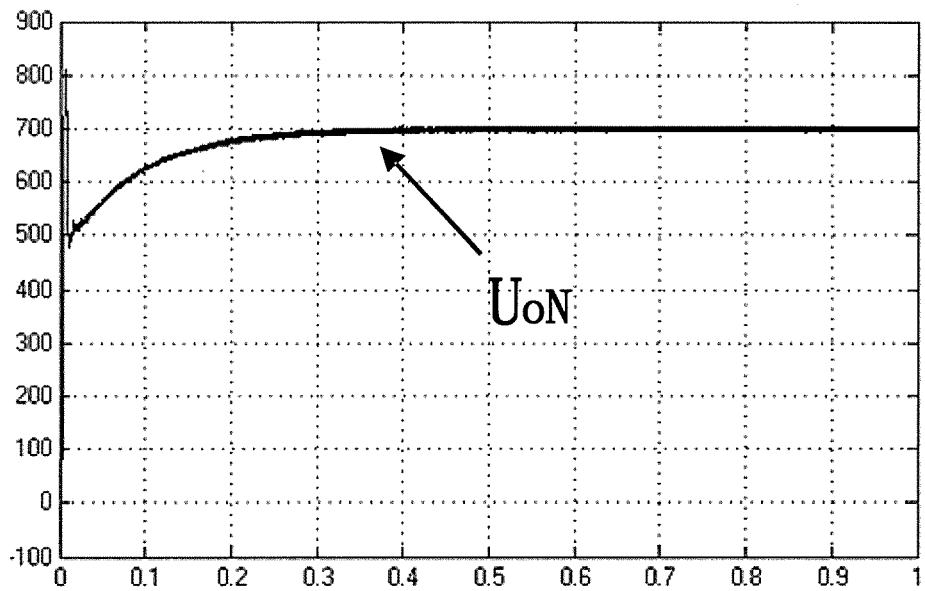
Figure 4C:
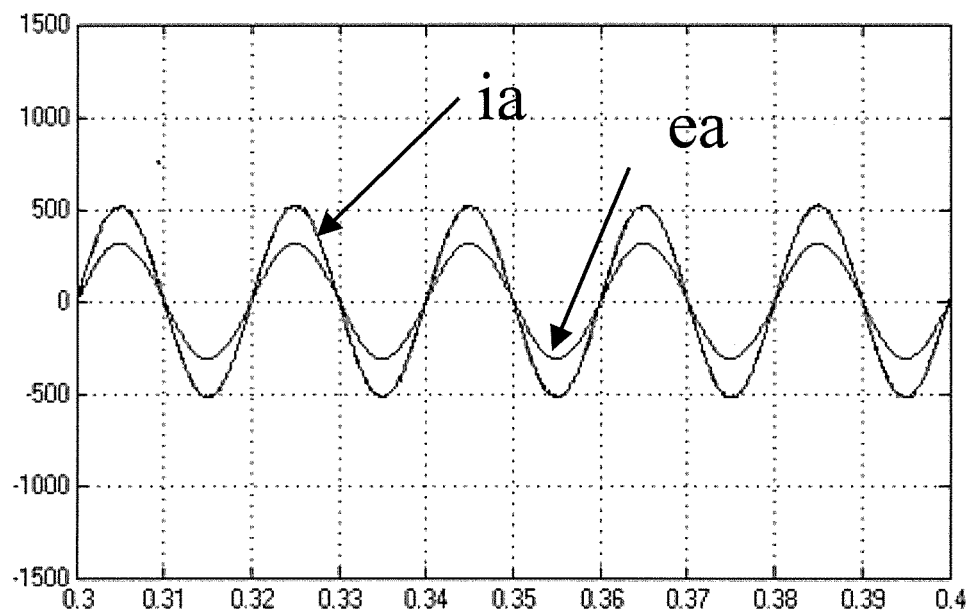

FIG. 4a to FIG. 4c are effect pictures of an output voltage U* (output voltage at DC side of the three-phase voltage type PWM rectifier module), an output voltage $U_{oN}$ (respective output voltage at DC side of the N-unit three-phase uncontrolled rectifier bridge module) and an input voltage ea (power grid a-phase voltage), input current ia (a-phase input current at AC side) of MATLAB simulation, working in mode (3), respectively.

Figure 5A:
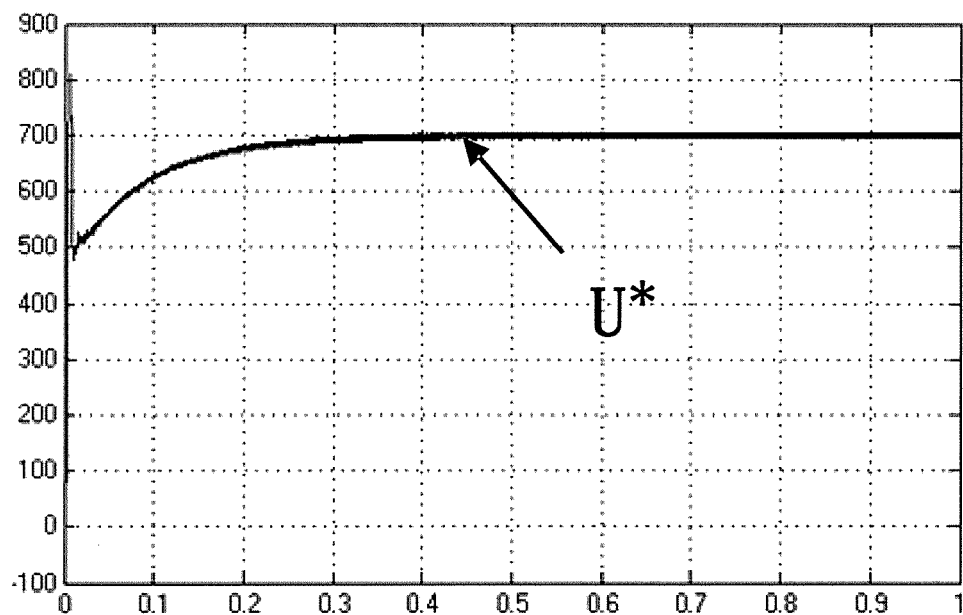
FIG. 5a to FIG. 5c are effect pictures of an output voltage U* (output voltage at DC side of the three-phase voltage type PWM rectifier module), an output voltage $U_{oN}$ (respective output voltage at DC side of the N-unit three-phase uncontrolled rectifier bridge module) and an input voltage ea (power grid a-phase voltage), an input current is (a-phase input current at AC side) of MATLAB simulation, working in mode (4), respectively.
Figure 5B:
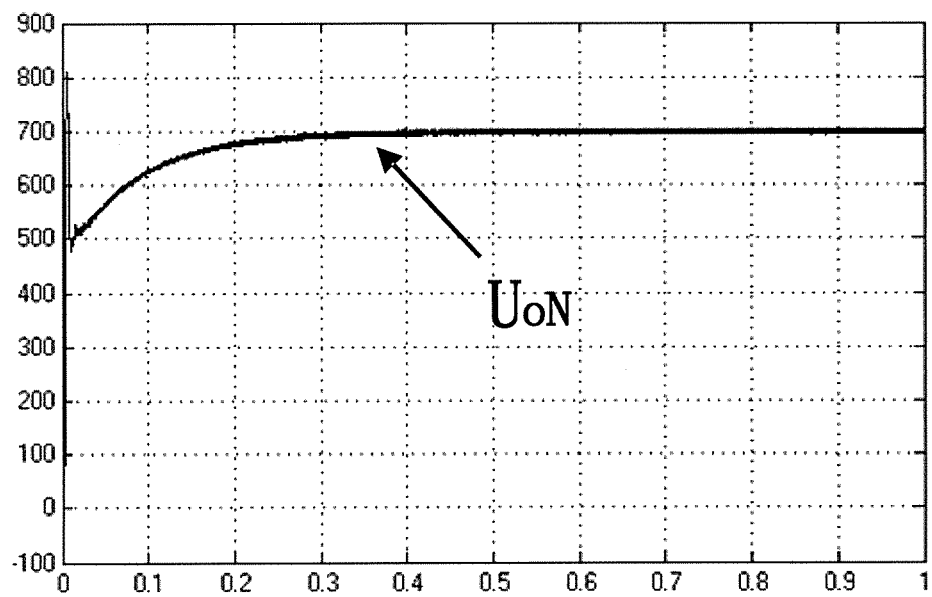
Figure 5C:
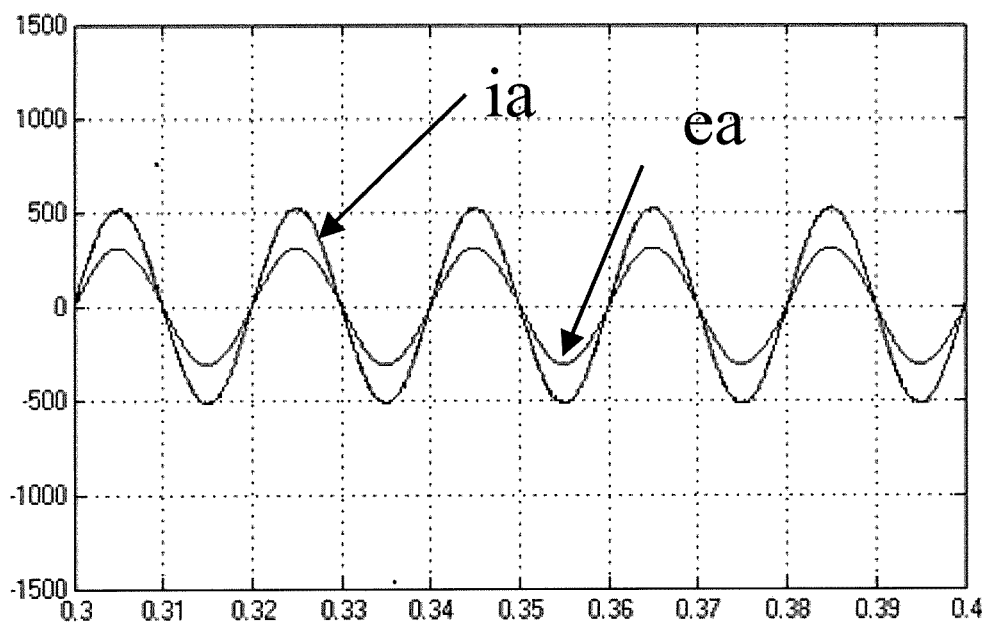

FIG. 5a to FIG. 5c are effect pictures of an output voltage U* (output voltage at DC side of the three-phase voltage type PWM rectifier module), an output voltage $U_oN$ (respective output voltage at DC side of the N-unit three-phase uncontrolled rectifier bridge module) and an input voltage ea (power grid a-phase voltage), an input current ia (a-phase input current at AC side) of MATLAB simulation, working in mode (4), respectively.

Accordingly, a waveform of an output voltage of a three-phase controllable rectifier is consistent with that of the three-phase uncontrolled rectifier module, and both ripples are very small. At the same time, a grid side current well tracks a grid side voltage, phases of both are the same and both are sine wave.

A person skilled in the art can make various amendments or supplements, or replacements by a similar way to the specific embodiments without going against the principle and spirit of the present invention, but these alterations all fall into the scope of protection of the present invention. Thus the scope of technology of the present invention is not limited to the above-described embodiments.

What is claimed is:

1. A control method for a hybrid transformation system based on three-phase voltage type PWM rectifier and multi-unit uncontrolled rectifier, wherein the hybrid transformation system based on three-phase voltage type PWM rectifier and multi-unit uncontrolled rectifier comprises: a three-phase reactor (L), a three-phase voltage type PWM rectifier module, an N-unit three-phase uncontrollable rectifier bridge module group, a plurality of capacitors (C0-CN), and a DSP control circuit, wherein the three-phase reactor at an end is connected to a three-phase power grid, other ends (A, B, C) of the three-phase reactor are connected to a middle of a bridge arm of a three-phase voltage type PWM rectifier module and a middle of a bridge arm of each three-phase uncontrolled rectifier bridge module, respectively, that is, the three-phase voltage type PWM rectifier module is connected in parallel to an input end of each three-phase uncontrollable rectifier bridge module, wherein the three-phase voltage type PWM rectifier module uses a six-switch three-phase half-bridge circuit topology, wherein in the N-unit three-phase uncontrollable rectifier bridge module group, each three-phase uncontrolled rectifier bridge module consists of a three-phase diode rectifier bridge, wherein the DSP control circuit controls a voltage output at DC side and a grid side power factor of the three-phase voltage type PWM rectifier module and the N-unit three-phase uncontrollable rectifier bridge module group, wherein the control method comprises:

a) using a phase-locking circuit to obtain a zero crossing point of an a-phase power grid (ea), the DSP control circuit real-time computing a cycle of the power grid according to the zero crossing point of the a-phase power grid (ea) and thereby changing a control cycle, meanwhile calculating a plurality of voltage values of the three-phase input power grid (ea, eb, ec) according to the zero crossing point of the a-phase power grid (ea);

b) sampling a plurality of input current values (ia, ib, ic) of the three-phase reactor using a hall current transducer, respectively, sampling a DC voltage value (U*) at both sides of the capacitor (C0) at DC side of the three-phase voltage type PWM rectifier module using a partial voltage method, and switching to a voltage of 0 to 3V by conditioning an operational circuit; and c) the DSP control circuit conducting a control computation according to the values sampled in a) and b), a specific control method using commonly used feed-forward decoupling control, current predictive control, fuzzy control to realize control of unity power factor, wherein under the various work modes and different levels of power output, the same control method can be used without independent adjustment.

2. The control method for the hybrid transformation system based on three-phase voltage type PWM rectifier and multi-unit uncontrolled rectifier according to claim 1, wherein an output of the transformation system has a plurality of alternative work modes:

1) in the N-unit three-phase uncontrollable rectifier bridge module group, an output end of each three-phase uncontrolled rectifier bridge module is connected to a same first load (RL) and a same first capacitor (CL) to realize parallel connection, while the three-phase voltage type PWM rectifier module works without load, and an output of the three-phase voltage type PWM rectifier module is connected only to a second capacitor (C0);

2) in the N-unit three-phase uncontrollable rectifier bridge module group, an output end of each three-phase uncontrolled rectifier bridge module is connected to a same first load (RL) and a same first capacitor (CL) to realize parallel connection, while the three-phase voltage type PWM rectifier module works with load, and at this moment, an output of the three-phase voltage type PWM rectifier module is in parallel connection with a second capacitor (C0) and a second load (R*);

3) in the N-unit three-phase uncontrollable rectifier bridge module group, an output end of each three-phase uncontrolled rectifier bridge module is independently with loads (R1-RN), respectively, each load is in parallel connection with one capacitor (C1-CN), respectively, while the three-phase voltage type PWM rectifier module works without load, and an output of the three-phase voltage type PWM rectifier module is connected only to a second capacitor (C0); or 4) in the N-unit three-phase uncontrollable rectifier bridge module group, an output end of each three-phase uncontrolled rectifier bridge module is independently with the loads (R1-RN), respectively, each load is in parallel connection with one capacitor (C1-CN), respectively, while the three-phase voltage type PWM rectifier module works with load, and at this moment, an output of the three-phase voltage type PWM rectifier module is in parallel connection with a second capacitor (C0) and a second load (R*).

3. The control method for the hybrid transformation system based on three-phase voltage type PWM rectifier and multi-unit uncontrolled rectifier according to claim 1, wherein an inductance value of the three-phase reactor (L) is capable of being selected according to requirements of a harmonic and a power of the system, with a select range of 0.1 mH to 1.5 mH; and a capacitance of each capacitor (C0, CL, C1 . . . CN) is selected according to requirements of an output voltage ripple of the system, with a select range of 2000 uf to 6000 uf.

* * * * *